G. F. Hawley,
Sharpening Reciprocating Saws.
N°. 35,935. Patented July. 22, 1862.
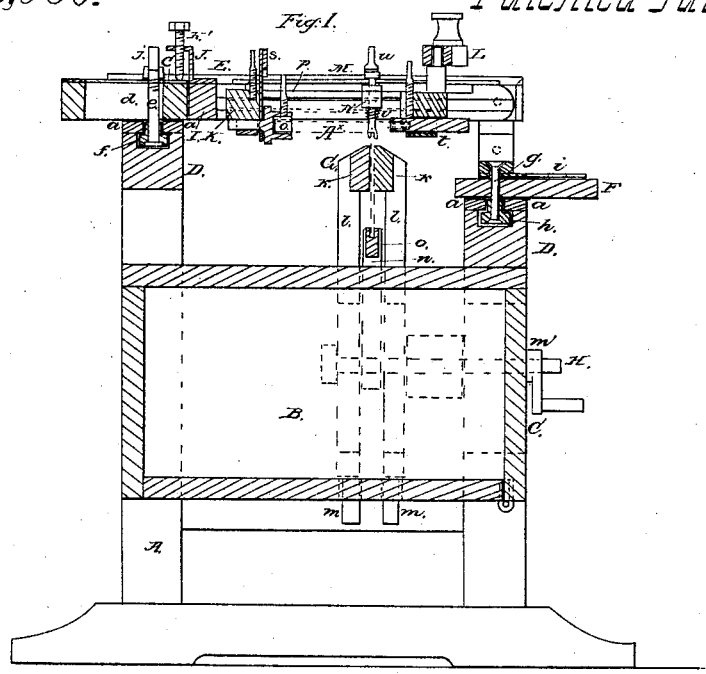
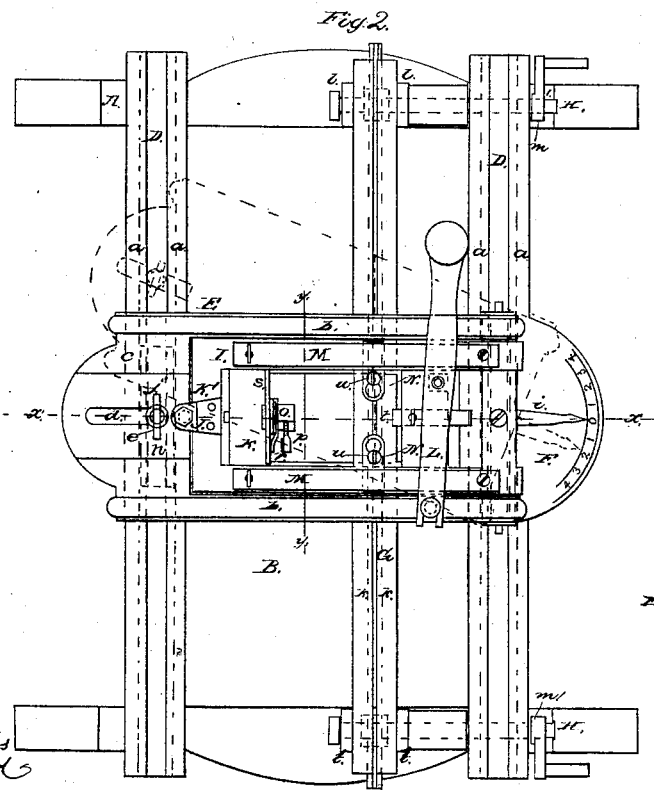
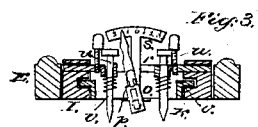

UNITED STATES PATENT OFFICE.

GEORGE F. HAWLEY, OF VIENNA, ILLINOIS.

IMPROVEMENT IN MACHINES FOR FILING SAWS.

Specification forming part of Letters Patent No. 35,935, dated July 22, 1862.

*To all whom it may concern:*

Be it known that I, GEORGE F. HAWLEY, of Vienna, in the county of Johnson and State of Illinois, have invented a new and Improved Machine for Filing Saws; and I do hereby declare that the following is a full, clear, and exact description of the same, reference being had to the accompanying drawings, making a part of this specification, in which—

Figure 1 is a transverse vertical section of my invention, taken in the line $x\ x$, Fig. 2. Fig. 2 is a plan or top view of the same; Fig. 3, a detached transverse vertical section of the file frame or slide, taken in the line $y\ y$, Fig. 2.

Similar letters of reference indicate corresponding parts in the several figures.

The object of this invention is to obtain a machine by which saws may be expeditiously filed or sharpened, and in such a manner that all the teeth will be acted upon and sharpened precisely alike, thereby producing perfect work, as well as facilitating the operation of saw-filing.

To enable those skilled in the art to fully understand and construct my invention, I will proceed to describe it.

A represents a frame, of rectangular form, in which a box or chest, B, is placed, said box or chest being provided with a door, C, at one side. This box or chest is designed as a repository for files and other tools. The longitudinal top pieces, D D, of the frame A are grooved in a longitudinal direction and are provided with cleats or strips $a\ a$, which form guides for a file-frame, E. This frame E is formed of two parallel bars, $b\ b$, connected at one end by a block or cross-piece, $c$, which is slotted, as shown at $d$, and has a screw-bolt, $e$, passing through the slot, said screw-bolt also passing through a bar, $f$, which is fitted and allowed to slide freely in one of the guides on frame A. The opposite end of the frame E is connected by a pivot with a block, F, which is attached to a bar, $h$, that is fitted in the guide of the other top piece of the frame A. The block F is of semicircular form and has a graduated scale marked upon it, as shown in Fig. 2, and the front part of the file-frame is provided with a pointer or index, $i$. By relaxing or unscrewing the nut $j$ of the bolt $e$, the frame E may be set at any angle on the frame A, as may be required. (See Fig. 2, in which the frame E is shown in an oblique position by dotted lines.)

In the frame A, a saw-clamp, G, is placed. This clamp is formed of two parallel bars, $k\ k$, the ends of which are attached to uprights $l$ at each side of the box or chest B. The uprights $l$ are provided with tenons $m$ at their lower ends, said tenons being fitted in mortises in the ends of the bottom of the box or chest B, which ends project beyond the sides of the box or chest. Through a slot in each of the uprights $l\ l$, at each side of the box or chest, there passes a screw-bolt, H, each of which a nut, $m'$, on it, provided with a crank. On each bolt H, and between the uprights $l\ l$ on it, there is fitted an upright bar, $n$, the upper ends of which have a horizontal bar, $o$, attached, which is grooved longitudinally in its upper surface to receive the back of the saw to be filed. This bar $o$, therefore, is a saw-rest, and it, with the bars $k\ k$, which form the saw-clamp, may be raised and lowered and secured at any desired point by screwing up the nuts $m'$ of the bolts H, which bolts pass through vertical slots in the uprights of the frame A.

In the frame E there is fitted another frame, I, the frame I being hinged to the frame E at its front end, so that its other end may rise and fall. To the back end of the frame I there is attached a lip, J, through which a set-screw, K', passes vertically, (see Fig. 1,) said set-screw resting or bearing on a metal plate, $n$, which is secured to the upper surface of the cross-piece $c$ of the frame E.

In the frame I there is fitted or placed a sliding frame, K, which is allowed to work freely back and forth in the frame I, and is operated by a lever, L. At the back end of the frame K there is secured a socket, $o$, in which one end of the saw-file is fitted and secured by a set-screw, $p$. The socket $o$ is allowed to turn in its bearing $g$, and said socket has an index or pointer, $r$, attached, which traverses over a graduated arc, $s$, and indicates the angle or position of the socket $o$. This will be fully understood by referring to Fig. 3. At the front end of the frame I there is a center bar, $t$, which receives the front end of the file.

M M are two bars, which are placed one at each side of the frame I, and are secured to it at one end, the opposite ends of the bars having screws passing through them, which screws pass into the sides of the frame I. In each side of the frame I there is placed or fitted a block, N, in each of which there is placed a vertical pin, $u$, having a spiral spring, $v$, around it.

The implement is used as follows: The saw to be filed is fitted and secured between the bars $k\ k$ of clamp G, the back of the saw being in the bar or rest $o$ and the teeth just above the bars $k\ k$. The file $A^\times$ (shown by dotted lines) is inserted in the frame I and is adjusted at a right angle, so as to give the proper or desired pitch to the saw-teeth by turning the socket $o$, the index $r$ and graduated arc $s$ serving as a guide to properly adjust the file. The frame E is then adjusted more or less obliquely on the frame A, the index $i$ and graduated block F serving as a guide for properly adjusting the frame E. The saw and clamp G are then raised until the saw is brought in contact with the file, and the depth of the cut of the file is regulated by means of the adjustable screw $K'$. The frame E is moved to one end of the frame A and the pins $u\ u$ are fitted in the teeth of the saw at each side of the file. The file is operated back and forth by means of the lever L, and every alternate tooth is filed, the frame E being moved laterally on the frame A by raising the frame K so that the file $A^\times$ will clear the teeth of the saw. After every alternate tooth is filed the saw is removed in the clamp G and the intermediate teeth are filed, the position of the frame E being reversed on the frame A.

By this invention the saws may not only be filed with facility, but also filed accurately with great precision and by persons of ordinary ability.

Having thus described my invention, what I claim as new, and desire to secure by Letters Patent, is—

1. The adjustable sliding frame E, provided with the internal frame, I, and internal sliding frame, K, in connection with the adjustable clamp G and adjustable rest $o$, or its equivalent, all arranged substantially as and for the purpose set forth.

2. The socket $o$, index $r$, and segment S, as shown and described, when applied to the sliding frame K and used in connection with the frames E I, as and for the purpose specified.

3. The index $i$ and graduated block F, the index being attached to the frame E and the block F attached to the bar $h$, when said index and block are used in connection with the frames E I K, as and for the purpose set forth.

GEORGE F. HAWLEY.

Witnesses:
A. J. KUYKENDALL,
CYRUS HOLMES.